(12) United States Patent
Cohen-Sason et al.

(10) Patent No.: US 11,601,459 B2
(45) Date of Patent: Mar. 7, 2023

(54) METHOD FOR GENERATING, SHARING AND ENFORCING NETWORK PROFILES FOR IOT DEVICES

(71) Applicant: CHECKPOINT SOFTWARE TECHNOLOGIES LTD., Tel Aviv (IL)

(72) Inventors: Daniel Cohen-Sason, Tel Aviv (IL); Pini Shamgar, Tel Aviv (IL); Yevgeny Fabrikant, Tel Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 178 days.

(21) Appl. No.: 17/159,615

(22) Filed: Jan. 27, 2021

(65) Prior Publication Data

US 2022/0239680 A1     Jul. 28, 2022

(51) Int. Cl.
*H04L 29/06* (2006.01)
*H04L 9/40* (2022.01)
*H04L 67/30* (2022.01)

(52) U.S. Cl.
CPC ...... *H04L 63/1425* (2013.01); *H04L 63/0236* (2013.01); *H04L 63/20* (2013.01); *H04L 67/30* (2013.01)

(58) Field of Classification Search
CPC . H04L 63/1425; H04L 63/0236; H04L 63/20; H04L 67/30
See application file for complete search history.

(56) References Cited

U.S. PATENT DOCUMENTS

| | | | |
|---|---|---|---|
| 9,853,945 B2* | 12/2017 | Branca | H04L 63/20 |
| 11,140,180 B2* | 10/2021 | Davis, III | H04L 61/5014 |
| 2016/0234232 A1* | 8/2016 | Poder | H04L 63/1408 |
| 2017/0149811 A1* | 5/2017 | Corrales | G05B 19/4185 |
| 2017/0195294 A1* | 7/2017 | Branca | H04L 63/102 |
| 2019/0387399 A1* | 12/2019 | Weinberg | H04L 63/1425 |
| 2022/0103591 A1* | 3/2022 | Maturana | H04L 63/1425 |

* cited by examiner

*Primary Examiner* — Beemnet W Dada
*Assistant Examiner* — Ka Shan Choy (57) ABSTRACT

A method and system is provided for setting network policies based on electronic devices connected to a network. The electronic devices present on the network are detected and their behavior is captured using profiles. These profiles are then used to generate network policies based on the electronic devices connected to the network. Instead of reacting to behavior of the electronic devices (e.g., anomaly detection to detect malware), the method and system sets the network policies to prevent unauthorized communications (e.g., before malware is present in the system).

13 Claims, 4 Drawing Sheets

METHOD FOR GENERATING, SHARING AND ENFORCING NETWORK PROFILES FOR IOT DEVICES

TECHNICAL FIELD

The present disclosure relates generally to Internet of things (IoT) devices and more particularly to detecting abnormal behavior in IoT devices.

BACKGROUND

Modern networks often host dozens of devices that communicate both inside and outside of the network. The increased number of network accessible devices has provided more targets for malware attacks. When a device is infected with malware, the device begins to behave differently (e.g., communicating with different devices).

SUMMARY

Internet-of-Things (IoT) devices typically behave similarly to their other instances. That is, IoT device having the same make and manufacturer typically behave similarly in different networks and environments, allowing a network profile to be modeled that represents "normal behavior" for a make and function of IoT device.

To achieve its objectives, devices infected with malware (in its different stages) act in the same host ecosystem and use the same resources as non-infected devices. But, the execution, persistence, reconnaissance, data exfiltration, etc. of an infected device will be different from that of a non-infected device, such that the behavior of an infected device will appear as an outlier when compared to a profile for the make and function of the infected device.

The present disclosure provides a system for determining and sharing network profiles of electronic devices and converting these network profiles into network policies. These network policies are implemented in zero-time based on the electronic devices present in the network and limit malicious behavior before malware is even present in the system.

According to one aspect, there is provided a method executed by circuitry for determining and sharing network profiles for electronic devices connected to a network. The method includes determining with the circuitry a make and a function of each of the electronic devices. For each of the electronic devices, the method uses the circuitry to detect communications in the network involving the electronic device over a duration of time. The detected communications include both incoming messages to the electronic device and outgoing messages from the electronic device. The method also generates profiles for the electronic devices using the circuitry, including, for each of the electronic devices, determining properties of the detected communications involving the electronic device including, for each of the detected communications, determining at least one of a protocol of the communication, a source of the communication, or a destination of the communication. Generating the profiles also includes generating a profile for each of the electronic devices based on the determined properties of the detected communications, including: a make and function of the electronic device; and acceptable communications enabled by the profile, wherein each of the acceptable communications includes a protocol, a source, and a destination. The method further sends the generated profiles with the circuitry to a server.

Alternatively or additionally, the method also includes receiving with the server a request for a profile. The request includes a make and a function. The method further includes identifying a profile associated with the make and function of the request and outputting with the server the identified profile.

Alternatively or additionally, the request additionally includes detected communications for the make and the function of the request. In addition to the identified profile being associated with the make and the function of the request, the identified profile enables the detected communications included with the request.

Alternatively or additionally, the method generates a modified profile from one of the profiles by: identifying a profile matching the make and the function of the request that does not enable all of the detected communications included with the request; and modifying the identified profile, such that all of the detected communications included with the request are enabled by the modified profile.

Alternatively or additionally, the method includes, for at least one of the generated profiles, converting the at least one generated profile to a network policy. The method also implements the network policy, such that a device connected to a network is prevented from: sending outgoing communications other than the acceptable outgoing communications; and receiving incoming communications other than the acceptable incoming communications.

Alternatively or additionally, the network policy includes at least one of a firewall policy or a network access control.

Alternatively or additionally, in addition to the circuitry determining the make and the function of each of the electronic devices, the circuitry also determines a function of each of the electronic devices.

Alternatively or additionally, the method splits the communications into external communications and internal communications. The external communications have a source or a destination that is external to the network. the internal communications have a source and a destination that is internal to the network. The generating of the profile includes at least one of: for at least one of the electronic devices, specifying at least one approved external communication source or approved external communication destination; or for at least one of the electronic devices, specifying at least one approved internal electronic source or approved internal communication destination.

Alternatively or additionally, the generating of the profiles includes both: for at least one of the electronic devices, specifying at least one approved external communication source or approved external communication destination; and for at least one of the electronic devices, specifying at least one approved internal electronic source or approved internal communication destination.

Alternatively or additionally, before generating the profile for each of the electronic devices based on the determined properties of the detected communications, the method applies a noise removal process to the detected communications including removing the detected communications comprising ancillary network traffic including operating system (OS) traffic. Applying a noise removal process to the detected communications also includes generating device specific communication groups by grouping the detected communications based on at least one of the manufacturer, function, or function of the electronic device involved in the detected communication. Applying a noise removal process to the detected communications also includes, for each of the generated device specific communication groups: generating internet protocol (IP) resolved communications by identifying a domain name involved in the detected communications; generating profile rules based on the generated IP resolved communications, wherein the generated profile rules enable performance of the generated IP resolved communications; and for each of the generated device specific communication groups, aggregating the generated profile rules by combining the generated profiles rules having a same source and destination.

According to another aspect, there is provided a server for sharing network profiles for electronic devices connected to a network. The server includes a memory, a network interface, and circuitry. The memory includes a non-transitory computer readable medium configured to store profiles for the electronic devices. Each of the profiles is associated with a make and function, and includes at least two of a protocol, a source, and a destination for acceptable communications. The network interface is configured to receive a request for a profile including at least one make and function. The circuitry is configured to identify applicable profiles comprising, for each of the received make and function of the request, identifying at least one profile associated with the make and function of the request as one of the applicable profiles. The circuitry also generates a policy by combining each of the applicable profiles. The combining of each of the applicable profiles includes: identifying the acceptable communications included in the applicable profiles; deduplicating the identified acceptable communications having a same protocol, source, and destination; and including in the policy the deduplicated acceptable communications.

Alternatively or additionally, the request additionally includes detected communications for the make and the function of the request. During the identification by the circuitry of the applicable profiles, the circuitry is configured to identify as one of the applicable profiles the profile associated with the make and the function of the request that enables the detected communications included with the request.

Alternatively or additionally, the circuitry is further configured to: generate, as one of the applicable profiles, a modified profile from one of the profiles by: identifying a profile matching the make and the function of the request that does not enable all of the detected communications included with the request; and modifying the identified profile, such that all of the detected communications included with the request are enabled by the modified profile.

According to one aspect, there is provided a system for implementing network profiles for electronic devices connected to a network. The system includes the server and a controlling electronic device. The controlling electronic device of the electronic devices connected to the network configured to receive from the server the generated policy as a network policy. The controlling electronic device also implements the network policy, such that the electronic devices connected to the network are prevented from: sending outgoing communications other than the acceptable outgoing communications; and receiving incoming communications other than the acceptable incoming communications.

Alternatively or additionally, the network policy includes at least one of a firewall policy or a network access control.

According to a further aspect, there is provided a detecting electronic device for determining and sharing network profiles for electronic devices connected to a network. The detecting electronic device includes a network interface and circuitry. The network interface is configured to, for each of the electronic devices, detect communications in the network involving the electronic device over a duration of time, wherein the detected communications include both incoming messages to the electronic device and outgoing messages from the electronic device. The circuitry determines a make and a function of each of the electronic devices. The circuitry also generates profiles for the electronic devices including: for each of the electronic devices, determining properties of the detected communications; and outputs the generated profiles. Determining properties of the detected communications includes: for each of the detected communications, determining at least one of a protocol of the communication, a source of the communication, or a destination of the communication; and generating a profile for each of the electronic devices based on the determined properties of the detected communications, including: a make and function of the electronic device; and acceptable communications each comprising a protocol, a source, and a destination.

Alternatively or additionally, in addition to the circuitry determining the make and the function of each of the electronic devices, the circuitry also determines a function of each of the electronic devices.

Alternatively or additionally, the circuitry is further configured to split the communications into external communications and internal communications. The external communications have a source or a destination that is external to the network. The internal communications have a source and a destination that is internal to the network. The generating of the profile includes at least one of: for at least one of the electronic devices, specifying at least one approved external communication source or approved external communication destination; or for at least one of the electronic devices, specifying at least one approved internal electronic source or approved internal communication destination.

Alternatively or additionally, the generating of the profiles includes both: for at least one of the electronic devices, specifying at least one approved external communication source or approved external communication destination; and for at least one of the electronic devices, specifying at least one approved internal electronic source or approved internal communication destination.

Alternatively or additionally, the circuitry is further configured to: before generating the profile for each of the electronic devices based on the determined properties of the detected communications, apply a noise removal process to the detected communications comprising: removing the detected communications comprising ancillary network traffic including operating system (OS) traffic; generating device specific communication groups by grouping the detected communications based on at least one of the manufacturer, model, or function of the electronic device involved in the detected communication; for each of the generated device specific communication groups: generating internet protocol (IP) resolved communications by identifying a domain name involved in the detected communications; generating profile rules based on the generated IP resolved communications. The generated profile rules enable performance of the generated IP resolved communications. For each of the generated device specific communication groups, aggregating the generated profile rules by combining the generated profiles rules having a same source and destination.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to a general embodiment, a method for setting network policies based on electronic devices connected to a network is provided. Instead of reacting to behavior of the electronic devices (e.g., anomaly detection to detect malware), the method sets the network policies to prevent unauthorized communications.

Figure 1:
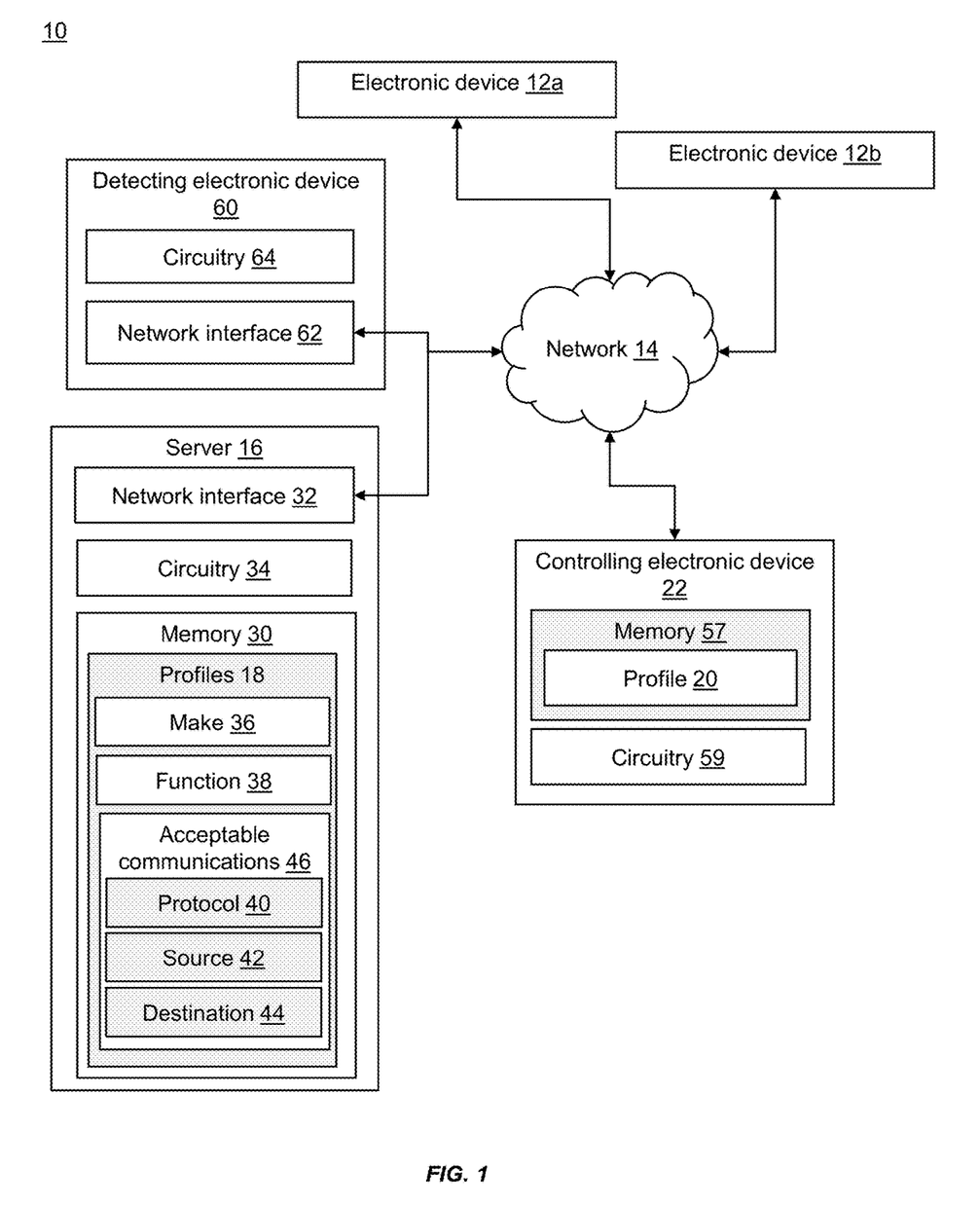
FIG. 1 is a schematic diagram of an embodiment of a system for implementing network profiles for electronic devices connected to a network.

In the embodiment depicted in FIG. 1, a system 10 is provided for implementing network profiles for electronic devices 12a, 12b connected to a network 14. The system includes the electronic devices 12 and a server 16. The server 16 identifies profile(s) 18 applicable to the electronic devices 12 of the network 14 and generates a network policy 20 from the identified profile(s) 18. A controlling electronic device 22 of the electronic devices 12 receives the network policy 20 from the server 16. The controlling electronic device 22 then causes the network policy 20 to be implemented on the network 14.

The electronic devices 12 may include any suitable device capable of communicating via the network 14. For example, the electronic devices 12 may include Internet of things (IoT) device, smart home accessories, medical equipment, computers, smart phones, etc. As an example, the electronic devices 12 for a network 14 may include a magnetic-resonance imaging (MRI) system, an imaging workstation, a picture archiving and communication system (PACS), and multiple workstations (e.g., used by technicians). In one embodiment, all of the electronic devices 12 are IoT devices.

The network policy 20 may be any suitable data structure. For example, the network policy 20 may include at least one of a firewall policy or a network access control. The network policy 20 may also be converted from one format into a firewall policy or a network policy or may be utilized in any way that prevents the electronic devices (e.g., IoT devices) from having network behavior different from the identified profile for each device. The profiles 18 may similarly be any suitable data structure. For example, each profile 18 may be a network policy applicable to the associated make and function of the device.

As described above, the server 16 shares network profiles 18 for the electronic devices 12 connected to the network 14. The server 16 includes a memory 30, network interface 32, and circuitry 34. The memory 30 is a non-transitory computer readable medium configured to store profiles 18 for the electronic devices 12. Each of the profiles 18 is associated with a make 36 and function 38 of an electronic device 12, and includes at least two of a protocol 40, a source 42, and a destination 44 for acceptable communications 46. The network interface 32 receives a request 48 for a profile 18 including at least one make 36 and function 38. The function 38 of the electronic device 12 may be determined in any suitable manner. In one embodiment, the function 38 is determined based on traffic (e.g., communications) sent and received by the electronic device 12. For example, the MAC address of the electronic device 12 and the running protocols for the electronic device 12 may be used to determine the function 38 of the electronic device 12. The function 38 may also be determined based on the make 36 and model of the electronic device 12. The function 38 may be a task performed by the electronic device 12. For example, the function 38 may be printer, thermostat, light controller, etc.

For each of the received make 50 and function 52 of the request 48, the circuitry 34 of the server 16 identifies applicable profiles 18. The applicable profiles 18 are profiles associated with at least one of the make 50 and function 52 of the request 48. The circuitry 34 then generates a policy 20 by combining each of the applicable profiles 18. In one embodiment, the applicable profiles 18 are combined by identifying the acceptable communications 46 included in the applicable profiles 18. These acceptable communications 46 may then be deduplicated by keeping only a single copy of the identified acceptable communications 46 that have the same protocol 40, source 42, and destination 44. The deduplicated acceptable communications may then be included in the policy 20.

As an example, an acceptable communication may include only a protocol 40 and a source 42 (i.e., a destination 44 is not provided). When a destination 44 is not provided, the acceptable communication 46 may be interpreted as allowing communications using the protocol 40 from the source 42 to any destination 44. Similarly, an acceptable communication may include only a protocol 40 and a destination 44 (i.e., a source 42 is not provided). When a source 42 is not provided, the acceptable communication 46 may be interpreted as allowing communications using the protocol 40 to the destination 44 from any source 42.

For example, two applicable profiles 18 may be identified based on a received request 48. The first applicable profile 18 includes an acceptable communication 46 using a particular protocol 40, a particular source 42, and a particular destination 44. The second applicable profile 18 includes an acceptable communication 46 using the same particular protocol 40, to the same particular source 42, and does not include a destination 44. Because the second applicable profile 18 may be interpreted as applying to all communication using the particular protocol 40 to the particular source 42, then the first applicable profile 18 may be determined to be contained within the second applicable profile 18 (i.e., the first applicable profile 18 applies to a single particular destination 44, while the second applicable profile 18 applies to all destinations 44 including the particular destination 44). In this example, when deduplicating, the acceptable communication 46 of the first applicable profile 18 may be discarded and the acceptable communication 46 of the second applicable profile 18 may be retained.

Figure 2:
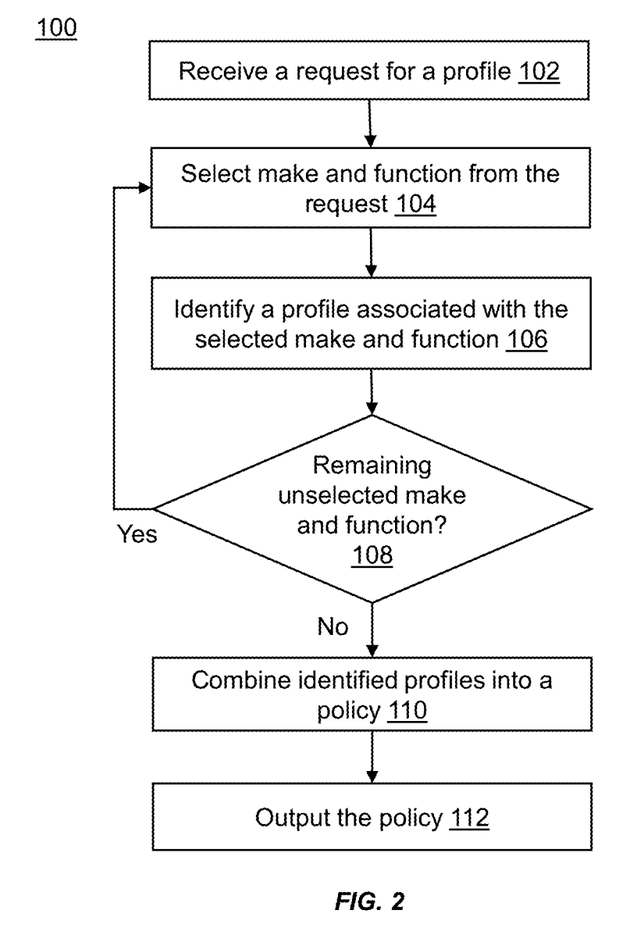
FIG. 2 is a flow diagram showing an exemplary method for sharing network profiles for electronic devices.

In the embodiment shown in FIG. 2, a method 100 is shown for sharing network profiles 18 for electronic devices 12. In process block 102, the server 16 receives a request 48 for a profile. The request 48 may have been sent by the controlling electronic device 22. The request 48 may include multiple data units 53 that each include a make 50 and function 52. In process block 104, a data unit 53 (i.e., a make 50 and function 52) from the request 48 is selected. In process block 106, a profile 18 is identified that is associated with the selected make 50 and function 52 of the request 48. In process block 108, a check is performed to determine if there are any remaining unselected data units 53. If yes, then processing returns to process block 104. If no, then processing continues to process block 110.

In one embodiment, if there is not a profile associated with the make and function in process block 106, then the method 100 may generate a profile for the selected make and function. For example, the method 100 may receive a list of the communications sent and/or received by the electronic device 12 and a profile may be generated that enables the received list of communications. The generating of the profile may be the same as the profile generation described below regarding step 130 in FIG. 4.

In process block 110, the identified profiles 18 are combined into a policy 20. In process block 112, the policy 20 is output by the server 16. For example, the policy 20 may be sent to the controlling electronic device 22 that sent the request 48. Alternatively, the policy 20 may be sent to a different device. In one embodiment the identified profiles 18 are sent to the controlling electronic device 22 and the controlling electronic device 22 combines the identified profiles 18 into a network policy 20. In one embodiment, the policy 20 is installed by the controlling electronic device 22.

Figure 3:
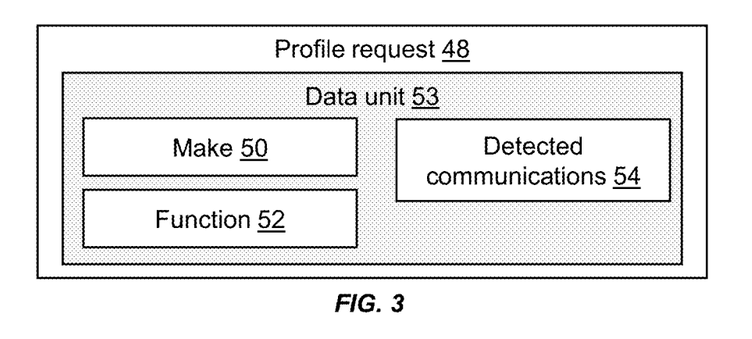
FIG. 3 is a schematic diagram of an exemplary profile request.

In the embodiment shown in FIG. 3, the request 48 additionally includes detected communications 54 for the make 50 and the function 52 of the request 48. When identifying the applicable profile(s) 18, the circuitry 34 identifies as one of the applicable profiles 18 the profile 18 that is associated with the make 50 and the function 52 of the request 48 and that enables the detected communications 54 included with the request 48. For example, the detected communications 54 may include a protocol, source, and destination. When identifying applicable profiles 18, the circuitry 34 may discard any profiles 18 that do not enable communication via the protocol, from the source, to the destination of each of the detected communications 54 included with the request 48.

In one embodiment, the circuitry 34 generates, as one of the applicable profiles 18, a modified profile 60 from one of the profiles 18. The modified profile 60 is modified by identifying a profile 18 matching the make 36 and the function 38 of the request 48 that does not enable all of the detected communications 54 included with the request 48. This identified profile 18 is modified, such that all of the detected communications 54 included with the request are enabled by the modified profile. For example, a profile 18 may be modified by adding to the acceptable communications 46 included with the profile 18 the detected communications 54 from the request 48 that are not enabled by the profile 18.

Figure 4:
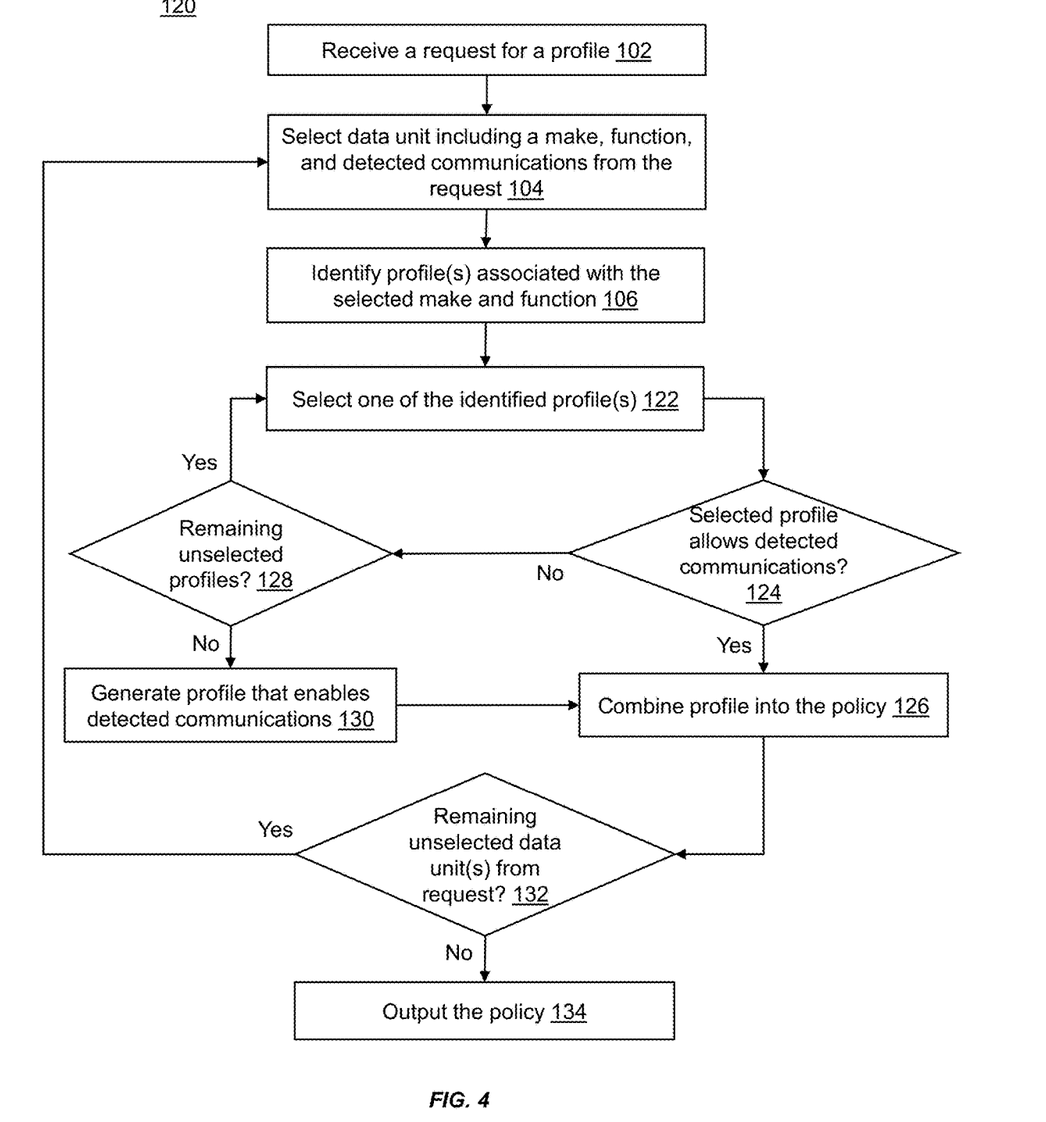
FIG. 4 is a flow diagram depicting an embodiment of a method for generating a network profile for a request including detected communications.

In the embodiment shown in FIG. 4, a method 120 is shown for generating a network profile 18 for a request 48 including detected communications 54. In process block 102, a request for a profile 48 is received. In process block 104, a data unit 53 is selected from the request 48. In process block 106, profile(s) are identified that match the make and the function of the selected data unit 53. In process block 122, one of the identified profiles 122 is selected. In decision block 124, a check is performed to determine if the selected profile allows the detected communications 54 included with the data unit 53. If yes, then processing continues to process block 126. If no, then processing continues to decision block 128.

In decision block 128, a check is performed to determine if there are any remaining unselected profiles. If yes, then processing returns to process block 122. If no, then processing continues to process block 130. In one embodiment, a make and function may only be associated with a single profile. In this embodiment, it would not be necessary to check if there are any remaining unselected profiles in decision block 128. Instead, processing would move from decision block 124 to process block 130 if the selected profile did not allow the detected communications.

In process block 130, a profile is generated that enables the detected communications, because none of the stored profiles allow the detected communications. For example, the profile may be generated using a profile that is associated with the make and function, but that does not enable all of the detected communications included with the request. This profile may be modified such that all of the detected communications included with the request are enabled by the modified profile. For example, if there exists a profile for the make and function that matches the protocol and source of the detected communications, but that is too restrictive regarding the destination, then the profile may be modified to list the destinations included in the detected communications or to remove communication having the given protocol and that is received from the given source. Similarly, instead of modifying an existing profile, a new profile may be created that enables the detected communications. The modified profile 60 may then be stored by the server 16.

Following process block 130 or decision block 124, the profile is combined into the policy in process block 126. In decision block 132, a check is performed to determine if there are any remaining unselected data units. If yes, process returns to process block 104. If no, then processing continues to process block 134. In process block 134, the policy is output.

In the above example of a network 14 including an MRI system, an imaging workstation, a PACS system, and multiple workstations, these electronic devices 12 may be involved with different types of communications. For example, the MRI system may send communications to the PACS system using the DICOM protocol. The PACS system may also send communications to the MRI system using the DICOM protocol. The MRI system may also send communications to Philips.com via the protocols of HTTP and HTTPS. Philips.com may send communications to the MRI system via the SSH protocol. The workstations may each send communications to the MRI via the protocols of SSH, TCP/8080, and HTTP. The imaging workstation may also send communication to the MRI using the DICOM protocol. These communications may be stored as detected communications and used (e.g., by the server 16, controlling electronic device 22, etc.) to generate a profile for the electronic device 12.

As described above, the controlling electronic device 22 receives from the server 16 the generated policy as a network policy. The controlling electronic device 22 may implement the network policy 20, such that the electronic devices 12 connected to the network 14 are prevented from sending and receiving outgoing communications other than the acceptable outgoing communications.

The controlling electronic device 22 may be any suitable computer device capable of implementing the policy (or causing the policy to be implemented) on the network 14. The controlling electronic device 22 includes a memory 57 (i.e., non-transitory computer readable medium), circuitry 59 (e.g., central processing unit (CPU)), a network interface, etc.

As shown in the embodiment depicted in FIG. 1, the system 10 may also include a detecting electronic device 60 for determining and sharing network profiles 20 for electronic devices 12 connected to the network 14. The detecting electronic device includes a network interface 62 and circuitry 64. The network interface 62 detects communications in the network 14 involving the electronic devices 12 over a duration of time. The detected communications include both incoming messages to the electronic devices 12 and outgoing messages from the electronic devices 12. The circuitry 64 determines a make and a function of each of the electronic devices 12.

The detecting electronic device 60 may generate and output a profile 18 for each of the electronic devices 12 based on the determined properties of the detected communications. For each of the electronic devices 12, the circuitry 64 may generate the profiles 18 by determining properties of the detected communications. That is, for each of the detected communications, the circuitry 12 may determine at least one of a protocol of the communication, a source of the communication, or a destination of the communication. In additional to determining the make and the function of each of the electronic devices, the detecting electronic device 60 may also determine a function of each of the electronic devices. The generated profiles 18 include a make and function of the electronic device and acceptable communications. The generated profiles 18 may also include a model of the electronic device. The acceptable communications each include a protocol, a source, and a destination.

The detecting electronic device 60 may also receive user input removing or adding acceptable communications. For example, if an electronic device 12 has not yet connected to a printer, the user may enable this communication by adding it to the acceptable communications for the device. Similarly, if a thermostat has communicated with the printer, the user may restrict this communication by removing it from the acceptable communications for the thermostat.

Alternatively, as opposed to the detecting electronic device 60 generating the profiles 18, the detecting electronic device 60 may pass the make, function, and detected communications to the server 16 and the server may generate the profiles based on the properties of the detected communications.

The detecting electronic device 60 may be any suitable computer device. For example, the detecting electronic device 60 may be a network switch, a router, or a network server. The controlling electronic device 22 and detecting electronic device 60 may also be embodied on the same computer device.

The detecting electronic device 60 may also split the communications into external communications and internal communications. The external communications have a source or a destination that is external to the network, while the internal communications have a source and a destination that is internal to the network.

In one embodiment, for at least one of the electronic devices, generating the profile may include specifying at least one approved external communication source or approved external communication destination. For example, instead of specifying a particular protocol and source or destination, the profile may simply identify an approved external communication destination or an approved external communication source. The approved external communication destination or source may then be approved for all communication protocols.

Similarly, in one embodiment, for at least one of the electronic devices, generating the profile may include specifying at least one approved internal communication destination or an approved internal communication source. Instead of specifying a particular protocol and source or destination, the profile may simply identify an approved internal communication destination or an approved internal communication source. The approved internal communication destination or source may then be approved for all communication protocols.

Figure 5:
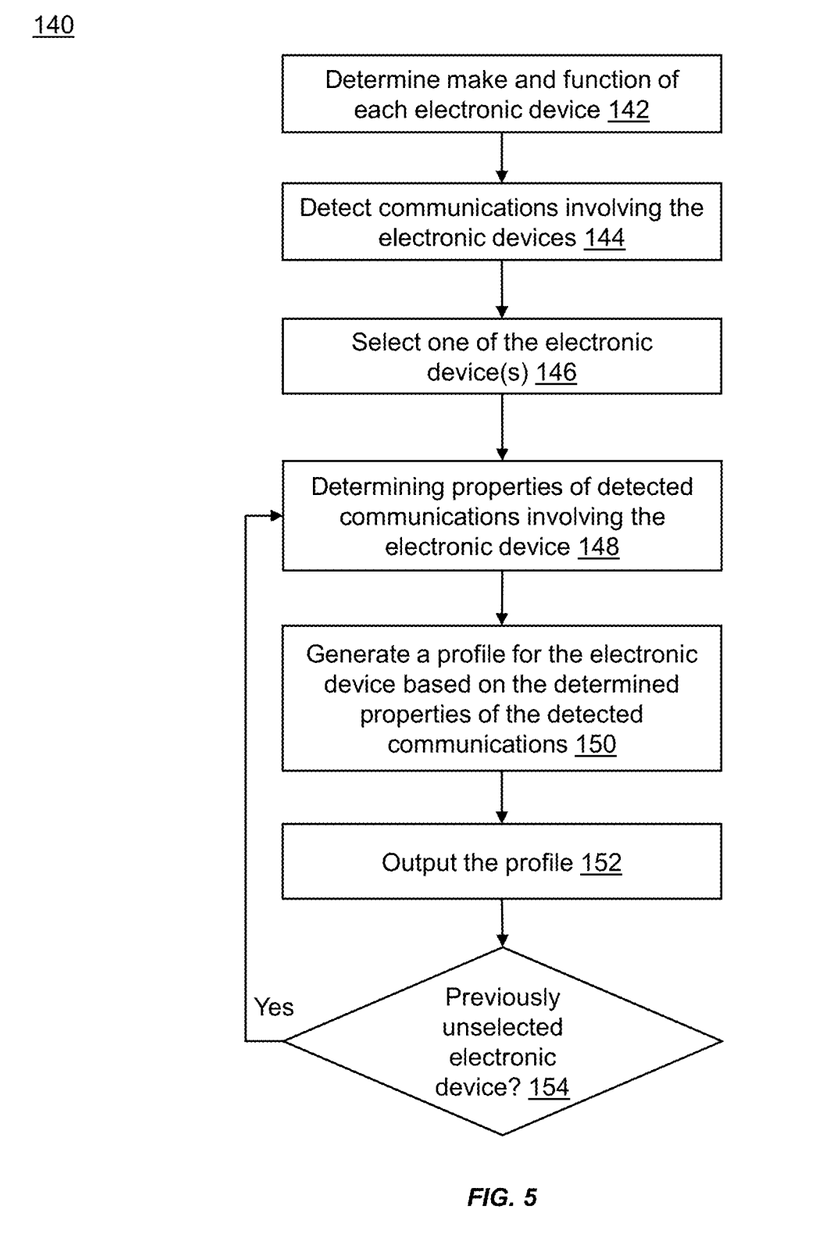
FIG. 5 is a flow diagram depicting an embodiment of a method for determining and sharing network profiles for electronic devices connected to a network.

In the embodiment shown in FIG. 5, a method 140 is shown for determining and sharing network profiles 20 for electronic devices 12 connected to a network 14. In process block 142, a make and a function of each of the electronic devices 12 on the network 14 is determined. In process block 144, communications are detected in the network involving the electronic device over a duration of time. In process block 146, an electronic device 12 is selected. In process block 148, properties are determined of the detected communications involving the selected electronic device 12. In process block 150, a profile 20 is generated for each of the electronic devices 12 based on the determined properties of the detected communications. In process block 152, the generated profiles are output. For example, the profiles 20 may be sent to the server 16.

Before generating the profile 20 for each of the electronic devices 12 based on the determined properties of the detected communications, a noise removal process may be applied to the detected communications. For example, the noise removal process may be performed by the server 16 or the detecting electronic device 60. The noise removal process improves the profiles, by avoiding traffic that is not relevant to the main behavior of the device.

In an exemplary embodiment, the noise removal process includes removing the detected communications comprising ancillary network traffic. For example, ancillary network traffic may include operating system (OS) traffic. The noise removal process may also include generating device specific communication groups by grouping the detected communications based on at least one of the manufacturer, model, or function of the electronic device involved in the detected communication. For each of the generated device specific communication groups, internet protocol (IP) resolved communications are generated by identifying a domain name involved in the detected communications. Profile rules are then generated based on the generated IP resolved communications. The generated profile rules enable performance of the generated IP resolved communications. For each of the generated device specific communication groups, the generated profile rules are aggregated by combining the generated profiles rules having a same source and destination.

The circuitry 34, 59, 64 may have various implementations. For example, the circuitry 34, 59, 64 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 34, 59, 64 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 34, 59, 64. The circuitry 34, 59, 64 may be communicatively coupled to the computer readable medium and network interface through a system bus, mother board, or using any other suitable structure known in the art.

The memory 30, 57 (also referred to as a computer readable medium) may be, for example, one or more of a buffer, a flash memory, a hard drive, a removable media, a volatile memory, a non-volatile memory, a random-access memory (RAM), or other suitable device. In a typical arrangement, the computer readable medium 30, 57 may include a non-volatile memory for long term data storage and a volatile memory that functions as system memory for the circuitry (e.g., processor). The computer readable medium 30, 57 may exchange data with the circuitry over a data bus. Accompanying control lines and an address bus between the computer readable medium 30, 57 and the circuitry also may be present. The computer readable medium 30, 57 is considered a non-transitory computer readable medium.

The network interface 32, 62 (also referred to as a communication interface) may comprise a wireless network adaptor, an Ethernet network card, or any suitable device that provides an interface to a network. The network interface 32, 62 may be communicatively coupled to the computer readable medium, such that the network interface 32, 62 is able to send data stored on the computer readable medium across the network and store received data on the computer readable medium. The network interface 32, 62 may also be communicatively coupled to the circuitry such that the circuitry is able to control operation of the network interface 32, 62. The network interface 32, 62, computer readable medium, and circuitry may be communicatively coupled through a system bus, mother board, or using any other suitable manner as will be understood by one of ordinary skill in the art.

Alternatively, the network interface 32, 62 may be a system bus when the electronic device 12, detecting electronic device, controlling electronic device, and/or server performs the methods described herein.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method executed by circuitry for determining and sharing network profiles for electronic devices connected to a network, the method comprising:
   determining with the circuitry a make and a function of each of the electronic devices;
   for each of the electronic devices, using the circuitry to detect communications in the network involving the electronic device over a duration of time, wherein the detected communications include both incoming messages to the electronic device and outgoing messages from the electronic device;
   splitting the communications into external communications and internal communications, wherein:
      external communications have a source or a destination that is external to the network; and
      internal communications have a source and a destination that is internal to the network; and
   generating profiles for the electronic devices using the circuitry, comprising:
      for each of the electronic devices, determining properties of the detected communications involving the electronic device including:
         for each of the detected communications, determining at least one of a protocol of the communication, a source of the communication, or a destination of the communication;
      generate a profile for each of the electronic devices based on the determined properties of the detected communications, including:
         a make and function of the electronic device; and
         acceptable communications enabled by the profile, wherein each of the acceptable communications includes a protocol, a source, and a destination; and
      for at least one of the electronic devices, specifying:
         at least one approval external communication source or approval external communication destination, or
         at least one approved internal electronic source or approved internal communication destination;
   sending the generated profiles with the circuitry to a server.

2. The method of claim 1, further comprising:
   receiving with the server a request for a profile, wherein the request includes a make and a function;
   identifying a profile associated with the make and function of the request; and
   outputting with the server the identified profile.

3. The method of claim 1, further comprising:
   for at least one of the generated profiles, converting the at least one generated profile to a network policy;

implementing the network policy, such that a device connected to a network is prevented from:
sending outgoing communications other than the acceptable outgoing communications; and
receiving incoming communications other than the acceptable incoming communications.

4. The method of claim 3, wherein the network policy includes at least one of a firewall policy or a network access control.

5. The method of claim 1, wherein the generating of the profiles includes both:
for at least one of the electronic devices, specifying at least one approved external communication source or approved external communication destination; and
for at least one of the electronic devices, specifying at least one approved internal electronic source or approved internal communication destination.

6. The method of claim 1, further comprising:
before generating the profile for each of the electronic devices based on the determined properties of the detected communications, applying a noise removal process to the detected communications comprising:
removing the detected communications comprising ancillary network traffic including operating system (OS) traffic;
generating device specific communication groups by grouping the detected communications based on at least one of a manufacturer, model, or function of the electronic device involved in the detected communication;
for each of the generated device specific communication groups:
generating internet protocol (IP) resolved communications by identifying a domain name involved in the detected communications;
generating profile rules based on the generated IP resolved communications, wherein the generated profile rules enable performance of the generated IP resolved communications; and
for each of the generated device specific communication groups, aggregating the generated profile rules by combining the generated profiles rules having a same source and destination.

7. A method executed by circuitry for determining and sharing network profiles for electronic devices connected to a network, the method comprising:
determining with the circuitry a make and a function of each of the electronic devices;
for each of the electronic devices, using the circuitry to detect communications in the network involving the electronic device over a duration of time, wherein the detected communications include both incoming messages to the electronic device and outgoing messages from the electronic device;
generating profiles for the electronic devices using the circuitry, comprising:
for each of the electronic devices, determining properties of the detected communications involving the electronic device including:
for each of the detected communications, determining at least one of a protocol of the communication, a source of the communication, or a destination of the communication:
generate a profile for each of the electronic devices based on the determined properties of the detected communications, including:
a make and function of the electronic device;
acceptable communications enabled by the profile, wherein each of the acceptable communications includes a protocol, a source, and a destination;
sending the generated profiles with the circuitry to a server;
receiving with the server a request for a profile, wherein the request includes a make, a function, and device specific detected communications of the detected communications for the make and the function of the request; and
identifying a profile associated with the make and function of the request, and that enables the device specific detected communications included with the request; and
outputting with the server the identified profile.

8. The method of claim 7, further comprising:
generating a modified profile from one of the profiles by:
identifying a profile matching the make and the function of the request that does not enable all of the device specific detected communications included with the request; and
modifying the identified profile, such that all of the device specific detected communications included with the request are enabled by the modified profile.

9. The method of claim 7, further comprising:
for at least one of the generated profiles, converting the at least one generated profile to a network policy;
implementing the network policy, such that a device connected to a network is prevented from:
sending outgoing communications other than the acceptable outgoing communications; and
receiving incoming communications other than the acceptable incoming communications.

10. The method of claim 9, wherein the network policy includes at least one of a firewall policy or a network access control.

11. A detecting electronic device for determining and sharing network profiles for electronic devices connected to a network, the detecting electronic device comprising:
a network interface configured to, for each of the electronic devices, detect communications in the network involving the electronic device over a duration of time, wherein the detected communications include both incoming messages to the electronic device and outgoing messages from the electronic device; and
circuitry configured to:
split the communications into external communications and internal communications, wherein:
external communications have a source or a destination that is external to the network: and
internal communications have a source and a destination that is internal to the network;
determine a make and a function of each of the electronic devices;
generate profiles for the electronic devices comprising:
for each of the electronic devices, determining properties of the detected communications including:
for each of the detected communications, determining at least one of a protocol of the communication, a source of the communication, or a destination of the communication;
generate a profile for each of the electronic devices based on the determined properties of the detected communications, including:
a make and function of the electronic device; and
acceptable communications each comprising a protocol, a source, and a destination; and for at least one of the electronic devices, specifying:
   at least one approved external communication source or approved external communication destination; or
   at least one approved internal electronic source or approved internal communication destination; and
output the generated profiles.

12. The detecting electronic device of claim 11, wherein the generating of the profiles includes both:
   for at least one of the electronic devices, specifying at least one approved external communication source or approved external communication destination; and
   for at least one of the electronic devices, specifying at least one approved internal electronic source or approved internal communication destination.

13. The detecting electronic device of claim 11, wherein the circuitry is further configured to:
   before generating the profile for each of the electronic devices based on the determined properties of the detected communications, apply a noise removal process to the detected communications comprising:
     removing the detected communications comprising ancillary network traffic including operating system (OS) traffic;
   generating device specific communication groups by grouping the detected communications based on at least one of a manufacturer, model, or function of the electronic device involved in the detected communication;
   for each of the generated device specific communication groups:
     generating internet protocol (IP) resolved communications by identifying a domain name involved in the detected communications;
     generating profile rules based on the generated IP resolved communications, wherein the generated profile rules enable performance of the generated IP resolved communications; and
   for each of the generated device specific communication groups, aggregating the generated profile rules by combining the generated profiles rules having a same source and destination.

* * * * *